United States Patent
Zhou et al.

(10) Patent No.: US 8,902,575 B2
(45) Date of Patent: Dec. 2, 2014

(54) SUPPORT APPARATUS AND ELECTRONIC DEVICE EMPLOYING SUPPORT APPARATUS

(75) Inventors: Cong-Bing Zhou, Shenzhen (CN); Chia-Te Yu, New Taipei (TW); Lin-Lin Pan, Shenzhen (CN); Quan-Chang Cheng, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 204 days.

(21) Appl. No.: 13/407,687

(22) Filed: Feb. 28, 2012

(65) Prior Publication Data

US 2012/0236527 A1 Sep. 20, 2012

(51) Int. Cl.
| | |
|---|---|
| G06F 1/16 | (2006.01) |
| H05K 5/00 | (2006.01) |
| H05K 7/00 | (2006.01) |
| H05K 7/02 | (2006.01) |
| H05K 7/04 | (2006.01) |
| H04M 1/00 | (2006.01) |
| A45D 19/04 | (2006.01) |
| A47J 47/16 | (2006.01) |
| F16M 11/00 | (2006.01) |
| A47G 29/00 | (2006.01) |
| F16M 13/00 | (2006.01) |
| F16M 11/04 | (2006.01) |
| F16M 11/10 | (2006.01) |
| F16M 11/38 | (2006.01) |
| H04M 1/04 | (2006.01) |

(52) U.S. Cl.
CPC .............. *F16M 13/00* (2013.01); *F16M 11/041* (2013.01); *F16M 11/10* (2013.01); *F16M 11/38* (2013.01); *H04M 1/04* (2013.01)

USPC .............. 361/679.3; 361/679.26; 361/679.55; 361/679.56; 361/679.59; 361/807; 455/575.3; 455/575.4; 248/127; 248/688

(58) Field of Classification Search
CPC ... G06F 1/1641; G06F 1/1601; G06F 1/1607; G06F 1/1613; G06F 1/1622; H05K 5/0234; H05K 7/14
USPC .............. 361/807, 683, 681, 679.55, 679.59, 361/679.26, 679.3, 679.56; 455/575.3–575.4; 248/127, 688
See application file for complete search history.

(56) References Cited

U.S. PATENT DOCUMENTS

| | | | | |
|---|---|---|---|---|
| 7,301,759 B2 * | 11/2007 | Hsiung | ..................... | 361/679.27 |
| 2005/0253040 A1 * | 11/2005 | Yang | ............................. | 248/688 |
| 2006/0238966 A1 * | 10/2006 | Sung | ............................. | 361/681 |
| 2010/0072334 A1 * | 3/2010 | Le Gette et al. | ........... | 248/176.3 |

* cited by examiner

*Primary Examiner* — Anthony Haughton
*Assistant Examiner* — Zhengfu Feng
(74) *Attorney, Agent, or Firm* — Novak Druce Connolly Bove + Quigg LLP (57) ABSTRACT

An exemplary support assembly is provided for supporting an electronic device on a supporting surface. The support assembly includes a shell receiving the electronic device, and a back-support. The shell defines an elongated sliding rail. The back-support includes a prop stand, and a prop seat slidable in the sliding rail. One side of the prop stand is rotatably engaged in the prop seat and serves as a spindle. The other sides of the prop stand are thus movable between a folded position substantially coplanar with the prop seat and a supporting position angled relative to the prop seat. When the other sides of the prop stand are in the supporting position, a tilt angle of the electronic device on the supporting surface is adjustable by sliding the prop seat in the sliding rail.

12 Claims, 7 Drawing Sheets

SUPPORT APPARATUS AND ELECTRONIC DEVICE EMPLOYING SUPPORT APPARATUS

BACKGROUND

1. Field of the Disclosure

The present disclosure generally relates to support apparatuses, and particularly to a support apparatus employed by an electronic device such as a mobile phone.

2. Description of Related Art

Handheld electronic devices are widely used in people's lives. Some handheld devices, such as mobile phones, are not only used for making calls or sending and receiving messages, but also may be used for watching television programs and movies, and placing video calls, for example. However, it is not very convenient for users to hold the handheld devices while they are enjoying the above-described image-based functions.

What is needed, therefore, is an apparatus which can overcome the above-described limitations.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Reference will now be made to the drawings to describe the preferred and exemplary embodiments in detail.

Figure 1:
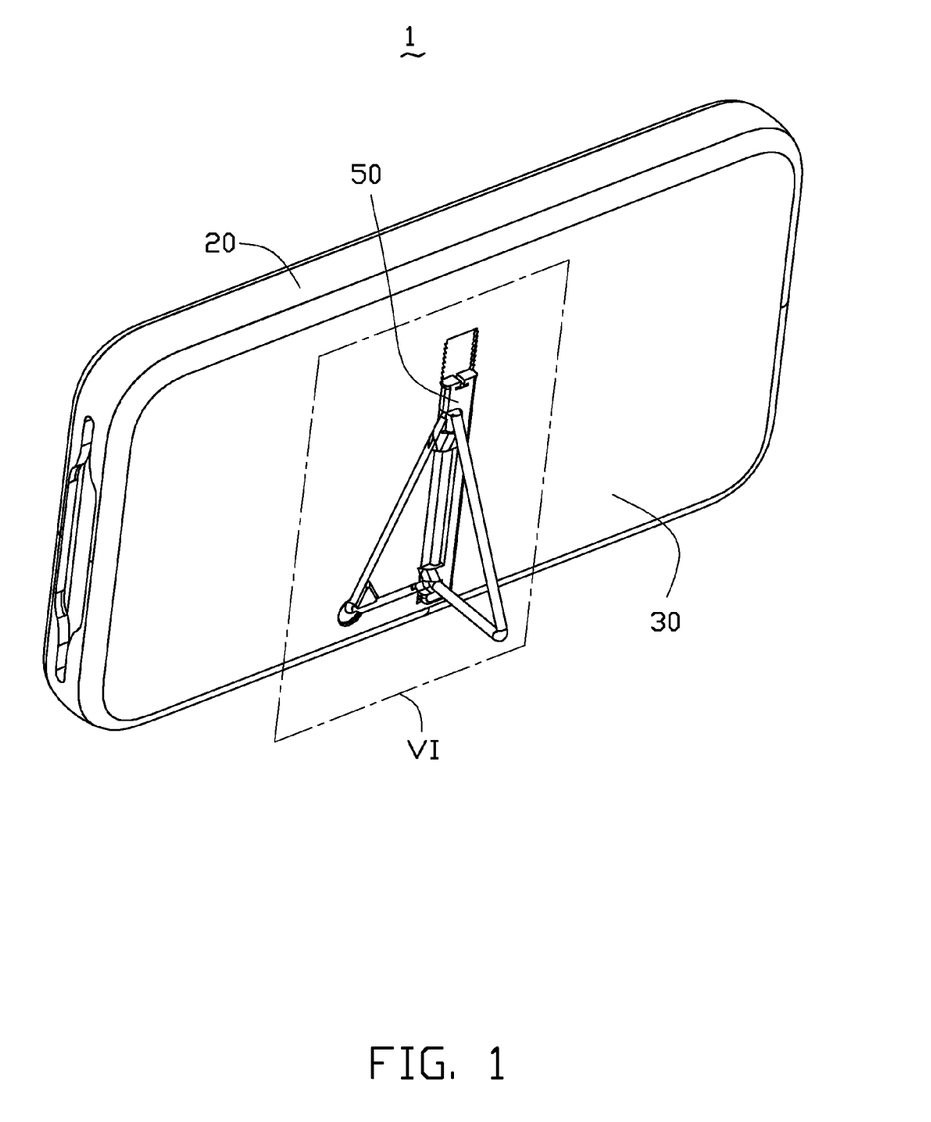
FIG. 1 is an isometric view of an electronic device assembly according to one embodiment, the electronic device assembly including a support apparatus, wherein the support apparatus is shown in an unfolded (i.e., supporting) state.
Figure 2:
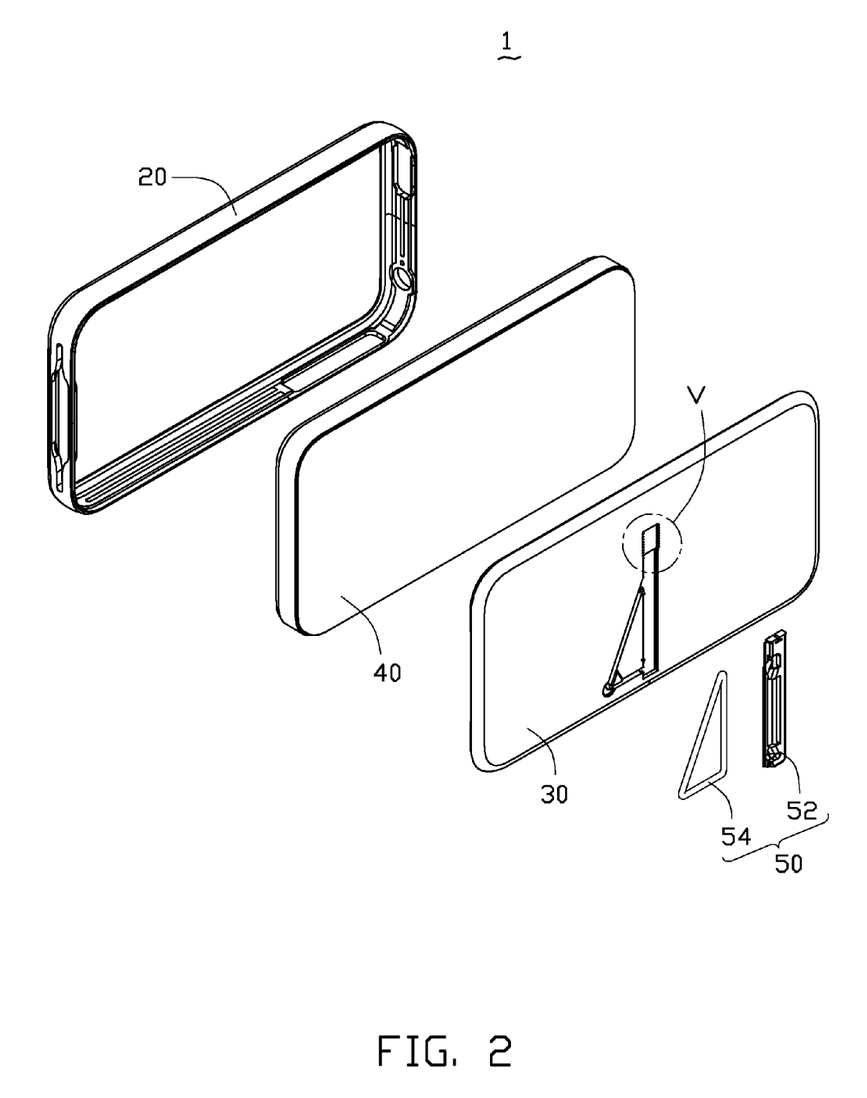
FIG. 2 is an exploded view of the electronic device assembly in FIG. 1.

FIGS. 1-2 are isometric views of an electronic device assembly 1 according to one embodiment. The electronic device assembly 1 includes a support apparatus (not labeled) and an electronic device 40. The electronic device 40 may be a portable device which includes a display surface for displaying images or pictures, such as a mobile phone, a personal digital assistant (PDA), a multimedia player, a tablet computer, etc. The support apparatus is attached to the electronic device 40 and supports the electronic device 40 on an object (not shown), such as a desktop or tabletop.

The support apparatus includes a shell (not labeled) for accommodating the electronic device 40. The shell exposes the display surface of the electronic device 40 via a window. The support apparatus further includes a back-support 50 attached to a rear of the shell, and the position and/or orientation of the back-support 50 is changeable relative to the shell. In this embodiment, the back-support 50 detachably engages with the shell. The shell includes a front cover 20 and a back cover 30, and the electronic device 40 can be fixed in an accommodating space cooperatively defined by the front cover 20 and the back cover 30. The back-support 50 includes a prop stand 54 and a prop seat 52. The prop seat 52 is detachably engaged with the back cover 30, and the prop stand 54 is rotatably attached to the prop seat 52. Thereby, the prop stand 54 can be switched between a folded state and an unfolded (i.e., supporting) state by rotating the prop stand 54. In the folded state, the prop stand 54 is substantially coplanar with the prop seat 52. In the supporting state, the prop stand 54 is substantially noncoplanar with the prop seat 52. In this embodiment, in a typical supporting state, the prop stand 54 is substantially perpendicular to the prop seat 52.

Figure 3:
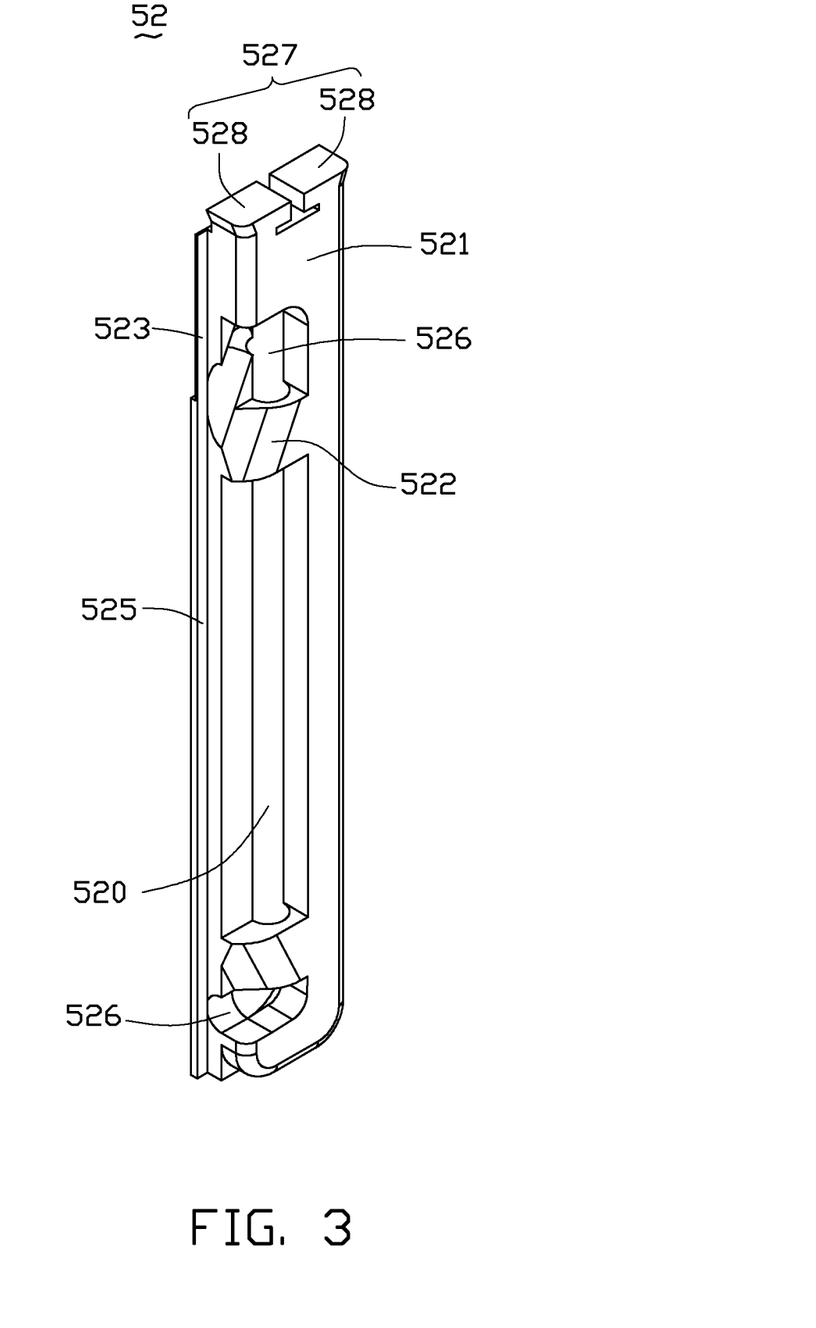
FIG. 3 is an enlarged view of a prop seat of the support apparatus of the electronic device assembly in FIG. 2.

Referring also to FIG. 3, the prop stand 54 is in the form of a polygonal frame. One side of the frame is rotatably fixed in the prop seat 52 and thus serves as a spindle of the prop stand 54. The other sides of the frame are fixed relative to the spindle. The other sides of the frame are capable of switching between an orientation substantially coplanar with the prop seat 52 and an orientation substantially noncoplanar with the prop seat 52, by a user gripping and pulling the prop stand 54 so that the spindle rotates in the prop seat 52. When the other sides of the frame are noncoplanar with the prop seat 52, they can serve as supporting sides of the frame. In this embodiment, the frame is a right triangle. A long side of the frame at the right angle acts as the spindle, and the other two sides of the frame act as the supporting sides.

The prop seat 52 includes a base 521, a sliding unit 523, and a first fixing unit 527. The base 521 may have an elongated shape, and define an elongated receiving groove 520 and at least one limiting member 522 bounding part of the receiving groove 520. The receiving groove 520 receives the spindle of the prop stand 54. In the illustrated embodiment, there are two limiting members 522 (only one labeled in FIG. 3). The limiting members 522 help hold the spindle of the prop stand 54 in the receiving groove 520. The base 521 also defines two notches 526 at one of the long sides thereof. One of the notches 526 is near a top of the base 521, and the other notch 526 is near a bottom of the base 521. The notches 526 communicate with the receiving groove 520, and correspond to two ends of the spindle of the prop stand 54. The notches 526 allow the supporting sides of the prop stand 54 to rotate when the spindle of the prop stand 54 is rotated. In this embodiment, the sliding unit 523 includes two sliding plates 525 extending from two opposite elongated sides of the base 521 (only the left one of the sliding plates 525 is visible in FIG. 3). An end portion of each sliding plate 525 near the top of the base 521 is thinner than the remaining main portion of the sliding plate 525. The first fixing unit 527 is located at a top of the base 521, and includes two elastically deformable hooks 528 extending in opposite lateral directions away from each other. The hooks 528 are spaced apart from each other by a gap.

Figure 4:
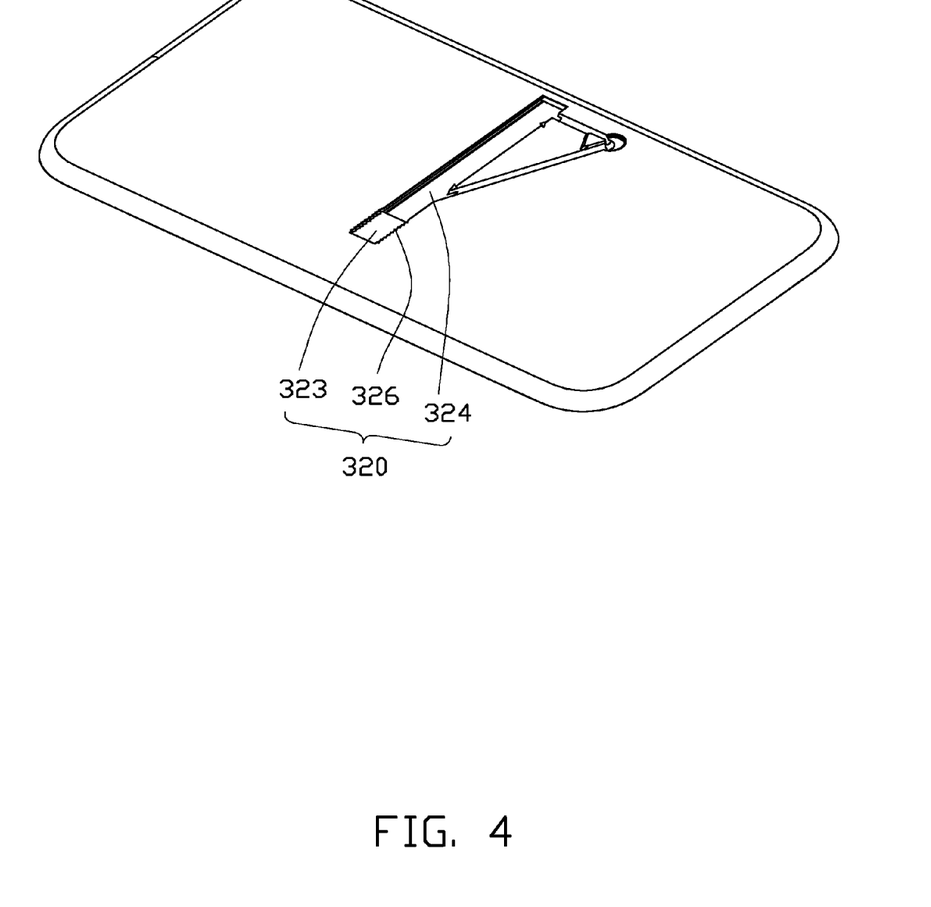
FIG. 4 is an isometric view of a back cover of the electronic device assembly in FIG. 2, viewed from another aspect.
Figure 5:
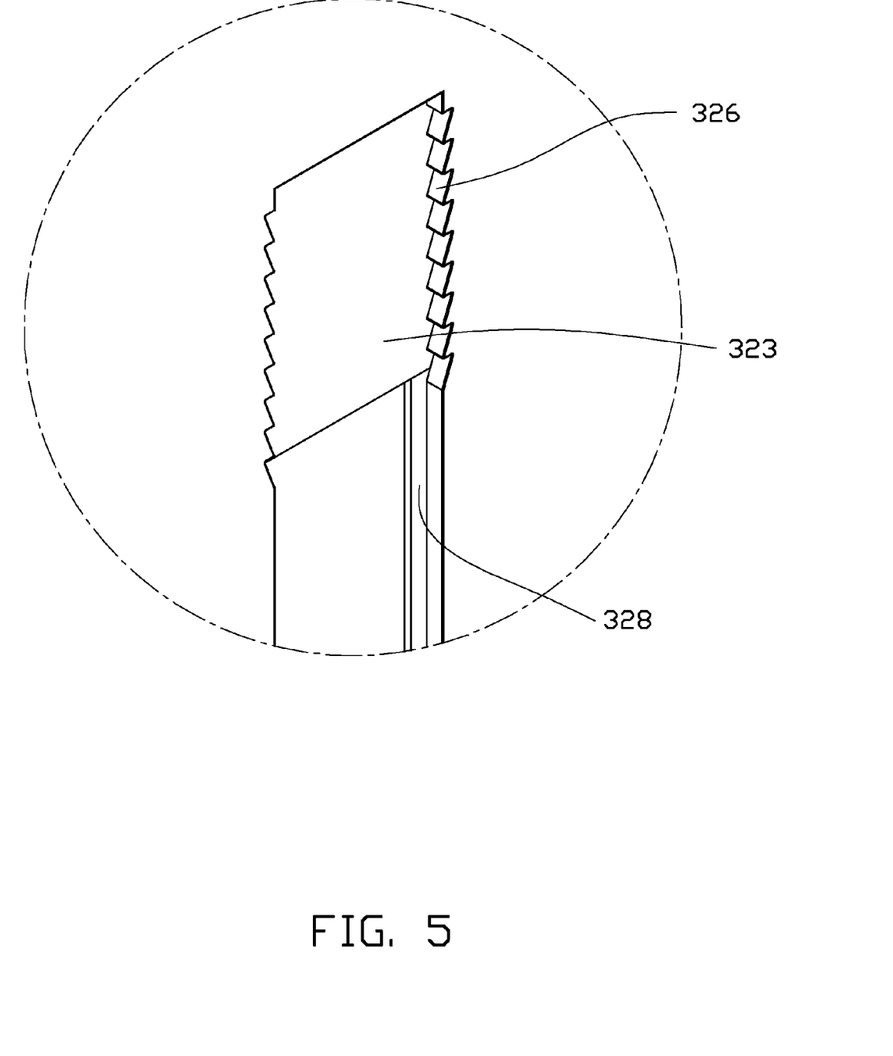
FIG. 5 is an enlarged view of a circled part V of the electronic device assembly in FIG. 2.

Referring also to FIGS. 4 and 5, the back cover 30 includes an elongated sliding rail 320 for receiving the prop seat 52 such that the prop seat 52 is slidable in the sliding rail 320. The sliding rail 320 has a length greater than that of the prop seat 52, and a width matching (i.e., suitable for) a width of the prop seat 52. The sliding rail 320 defines a sliding groove 324, and the sliding groove 324 is bounded by two opposite long sidewalls (not labeled). A top end of each sidewall includes a plurality of teeth. The teeth of both sidewalls cooperatively serve as a second fixing unit 326 of the sliding rail 320. Each sidewall defines a slot 328. An end portion of each slot 328 at the second fixing unit 326 is narrower than the remaining main portion of the slot 328. The narrower end portion of each slot 328 corresponds to the thinner end portion of a respective sliding plate 525, and the remaining main portion of the slot 328 corresponds to the remaining main portion of the respective sliding plate 525. A top portion of the sliding rail 320 at the second fixing unit 326 includes a recessed plate 323. The recessed plate 323 substantially interconnects the two opposite sidewalls of the sliding groove 324. Thus when the two opposite sliding plates 525 of the sliding unit 523 engaged in the slots 328, the recessed plate 323 supports a top portion of the prop seat 52. In addition, the second fixing unit 326 matches with the two hooks 528. Thereby, when the two hooks 528 of the prop seat 52 are slid along the teeth of the second fixing unit 326 to a desired position (described in more detail below), the teeth of the second fixing unit 326 can hold the hooks 528 in the desired position so that the prop seat 52 is fixed at a desired position in the sliding rail 320.

Figure 6:
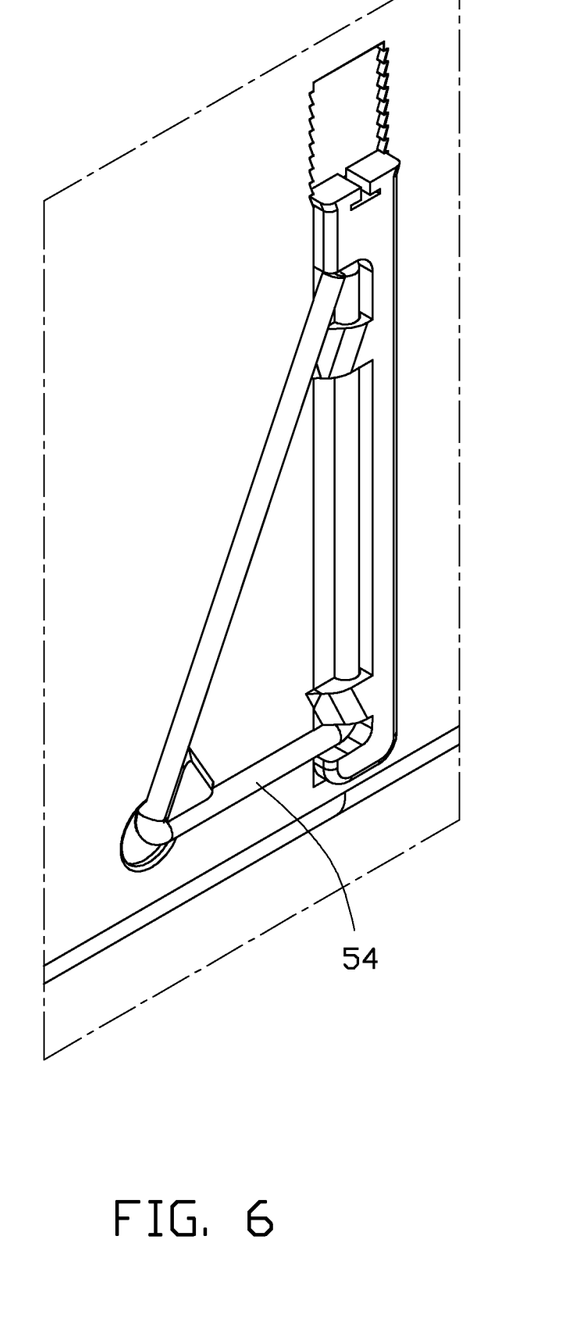
FIG. 6 is a view of a portion marked VI of the electronic device assembly in FIG. 1, but showing the support apparatus in a folded state.
Figure 7:
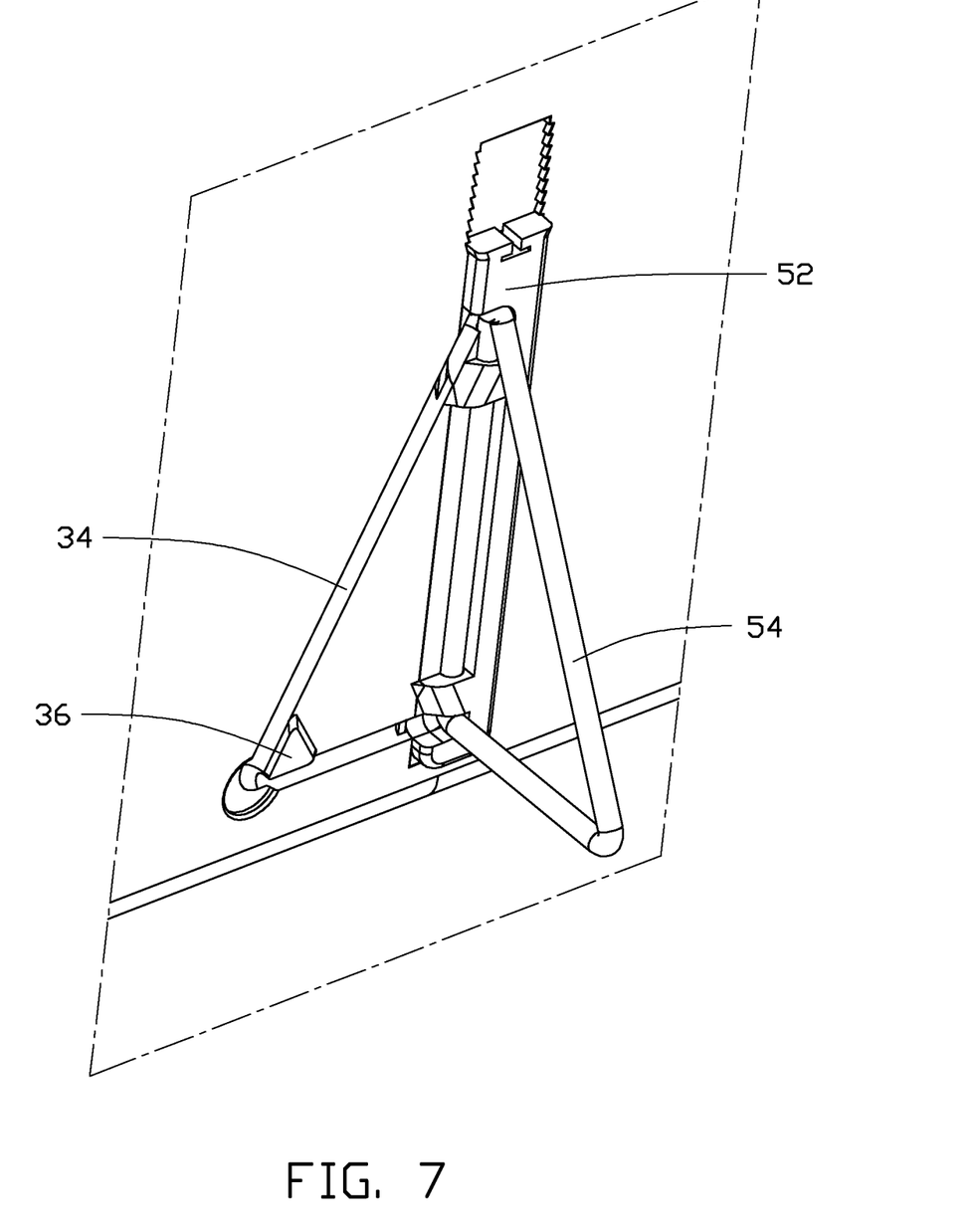
FIG. 7 is a view of the portion marked VI of the electronic device assembly in FIG. 1.

Referring also to FIGS. 6 and 7, the back cover 30 further includes a receiving channel 34 communicating with the sliding rail 320. The shape and size of the receiving channel 34 are substantially the same as those of the supporting sides of the prop stand 54. When the prop seat 52 is located at a predetermined position in the sliding rail 320, the prop stand 54 can be rotated towards the receiving channel 34 so that the supporting sides of the prop stand 54 are snugly received in the receiving channel 34. In the present embodiment, the predetermined position of the prop seat 52 in the sliding rail 320 is a lowest position, wherein the hooks 528 are engaged with bottommost teeth of the second fixing unit 326. When the supporting sides of the prop stand 54 are received in the receiving channel 34, the lower (horizontal) supporting side of the prop stand 54 is received in a lower (horizontal) portion of the receiving channel 34, and the inclined supporting side of the prop stand 54 is received in an inclined portion of the receiving channel 34.

A locking member 36 is disposed on the back cover 30 beside a corner of the receiving channel 34 where the horizontal and inclined portions of the receiving channel 34 meet. In particular, in the illustrated embodiment, the locking member 36 is in the form of a block with sloped sides, which is located at an inner side of the elbow of the corner of the receiving channel 34. When the supporting sides of the prop stand 54 are received in the receiving channel 34, the locking member 36 abuts against a corner of the prop stand 54 where the lower and inclined supporting sides meet. In particular, the locking member 36 abuts against an inner side of the elbow of the corner of the prop stand 54. Thus, the locking member 36 prevents the supporting sides of the prop stand 54 from falling out of the receiving channel 34.

In assembly of the electronic device assembly 1, the spindle of the prop stand 54 is received in the receiving groove 520 of the prop seat 52 and is limited in the receiving groove 520 by the limiting members 522. The prop seat 52 is received in the sliding rail 320 of the back cover 30, and the sliding plates 525 of the prop seat 52 are received in the slots 328 of the sliding rail 320 to allow the prop seat 52 to slide along the sliding rail 320. When the user wants to fold the back-support 50, the sliding plates 525 of the prop seat 52 can be slid down along the slots 328 until the supporting sides of the prop stand 54 are positioned corresponding to the receiving channel 34. Then the supporting sides of the prop stand 54 are rotated, in unison with the spindle rotating in the prop seat 52, toward the back cover 30. The rotation continues until the supporting sides of the prop stand 54 are received in the receiving channel 34 of the back cover 30. In this position, the locking member 36 abuts against the inner side of the elbow of the corner of the prop stand 54, to prevent the supporting sides of the prop stand 54 from falling out from the receiving channel 34. Thus, the prop stand 54 is securely held in the folded state.

When the user wants to unfold the prop stand 54 to the supporting state, the user can exert force on the corner of the prop stand 54 to draw the corner of the prop stand 54 out from the locking member 36, and rotate the supporting sides of the prop stand 54 away from the back cover 30. When the force is released by the user, the prop stand 54 stops rotating, and the supporting sides of the prop stand 54 stop at an angled position relative to the prop seat 52 by friction between the prop stand 54 and the prop seat 52. Thus, the prop stand 54 is switched from the folded state to the supporting state. In this embodiment, when the prop stand 54 is in the supporting state, the angle between the supporting sides of the prop stand 54 and the prop seat 52 is essentially anywhere in the range from about 0 degrees to about 90 degrees, as selected by the user.

In addition, when the prop stand 54 is in the supporting state, the prop seat 52 can be slid along the sliding rail 320, to adjust the height of the prop stand 54 relative to the back cover 30 and thereby adjust an angle of inclination of the electronic device 40 relative to a supporting surface (such as a desktop or tabletop) that supports the electronic device assembly 1. When the prop seat 52 is slid up or down along the sliding rail 320, the prop seat 52 can be held in any of a variety of desired positions by cooperation of the hooks 528 engaging with selected pairs of the teeth of the second fixing unit 326. In particular, the user presses the hooks 528 toward each other to reduce the distance between the two hooks 528, thereby releasing the hooks 528 from the pairs of teeth of the second fixing unit 326 that the hooks 528 are currently engaged with. Then the prop seat 52 can be slid along the sliding rail 324 to a desired position. At the desired position, the user releases the hooks 528, which elastically return to their original orientations and engage with adjacent pairs of the teeth of the second fixing unit 326. The prop seat 52 is thus adjusted to and held in a desired position along the sliding groove 320.

Referring to FIG. 6, this shows the prop stand 51 in the folded state. The supporting sides of the prop stand 54 are held in the receiving channel 34 of the back cover 30. The locking member 36 abuts against the inner side of the elbow of the corner of the prop stand 54, to prevent the supporting sides of the prop stand 54 from falling out of the receiving groove 34.

Referring to FIG. 7, this shows the prop stand 54 is in the typical supporting state. When the user wants to move the prop stand 54 from the folded state to the supporting state, the user can apply force on the corner of the prop stand 54, to make the corner of the prop stand 54 depart from the locking member 36. The user then rotates the supporting sides of the prop stand 54 in unison with rotation of the spindle of the prop stand 54 in the prop seat 52 so that the prop stand 54 is angled relative to the prop seat 52. When the prop stand 54 has rotated to a desired angled position, the user releases the external force, and the prop stand 54 stays in the desired position by friction between the prop stand 54 and the prop seat 52. That is, the prop stand 54 is held stationary in the desired position. Thus, the support apparatus is securely maintained in the desired supporting state, and can stably support the electronic device 40 on a supporting surface.

When a user wants to use the electronic device 40 in a hands free state, for example when he/she desires to watch television programs, the support apparatus can be set in the supporting state to support the electronic device 40 on, e.g., a desktop or a tabletop. The included angle between the back cover 30 and the prop stand 54 can be adjusted by rotating the prop stand 54. In addition, the user can apply force to the two hooks 528 of the prop seat 52 and slide the prop seat 52 along the sliding rail 320 of the back cover 30, to move the prop seat 52 to a desired location along the sliding rail 320 and retain the prop seat 52 in the desired location.

When the user no longer needs the electronic device 20 in the hands free state, the user can conveniently fold the support apparatus. In detail, the user slides the prop seat 52 along the sliding rail 320 until the supporting sides of the prop stand 54 correspond to the receiving channel 34 of the back cover 30. Then the user rotates the supporting sides of the prop stand 54 to the position coplanar with the prop seat 52. Thereby, the supporting sides of the prop stand 54 are received in the receiving channel 34 of the back cover 30 and held in that position by the locking member 36.

Thus, due to the support apparatus being compact and conveniently adjusted, the support apparatus is beneficial to the user of the electronic device 40.

It is believed that the present embodiments and their advantages will be understood from the foregoing description, and it will be apparent that various changes may be made thereto without departing from the spirit and scope of the embodiments or sacrificing all of their material advantages.

What is claimed is:

1. A support apparatus for supporting an electronic device on a supporting surface, the support apparatus comprising:
a shell configured to receive the electronic device, the shell defining an elongated sliding rail; and
a back-support comprising:
a prop seat detachably engaged in the sliding rail and slidable in the sliding rail upon application of an external force; and
a prop stand having one side rotatably engaged in the prop seat and serving as a spindle, and at least another side fixed relative to the spindle and capable of being switched between a folded state in which the at least another side is substantially coplanar with the prop seat and a supporting state in which the at least another side is angled relative to the prop seat and serves as at least a supporting side, the switching executable by rotating the at least another side in unison with rotating the spindle in the prop seat;
wherein when the at least another side of the prop stand is angled relative to the prop seat, a tilt angle of the electronic device on the supporting surface is adjustable by sliding the prop seat in the sliding rail, the prop seat comprises a base, a sliding unit and a first fixing unit, the base comprises an elongated receiving groove having the spindle of the prop stand rotatably received therein and at least one limiting member bounding part of the receiving groove to help hold the spindle of the prop stand in the receiving groove, the sliding unit is slidable along the sliding rail, the sliding rail comprises a second fixing unit, and the prop seat is capable of being held at a desired position in the sliding rail by cooperation of the first fixing unit with the second fixing unit, the first fixing unit is located at a top of the base of the prop seat, and comprises two elastically deformable hooks extending away from each other, the sliding rail defines a sliding groove, the sliding groove is bounded by two opposite long sidewalls, a top end of each sidewall comprises a plurality of teeth, and the teeth of both sidewalls cooperatively serve as the second fixing unit of the sliding rail, and when the two hooks of the prop seat are slid along the teeth of the second fixing unit to a desired position, the teeth hold the hooks in the desired position so that the prop seat is held at the desired position in the sliding rail, the sliding unit comprises two sliding plates extending from two opposite elongated sides of the base, each sidewall of the two opposite long sidewalls of the sliding groove defines a slot, and the sliding plates are slidably engaged in the slots such that the prop seat is slidable in the sliding rail, an end portion of each sliding plate near the top of the base is thinner than a remaining main portion of the sliding plate, and an end portion of each slot at the second fixing unit is narrower than a remaining main portion of the slot, the narrower end portion of each slot corresponds to the thinner end portion of a respective sliding plate, and the remaining main portion of said each slot corresponds to the remaining main portion of the respective sliding plate.

2. The support apparatus of claim 1, wherein a top portion of the sliding rail at the second fixing unit comprises a recessed plate, the recessed plate substantially interconnects the two opposite sidewalls of the sliding groove, and the recessed plate supports a top portion of the prop seat.

3. The support apparatus of claim 1, wherein the prop stand is a triangular frame, one side of the triangular frame serves as the spindle, the at least another side of the prop stand is the other two sides of the triangular frame, and the other two sides of the triangular frame serve as two supporting sides.

4. The support apparatus of claim 3, wherein the base further defines two notches at one long side thereof, one of the notches is near a top of the base, the other notch is near a bottom of the base, the notches communicate with the receiving groove and correspond to two ends of the spindle of the prop stand, and the notches allow the two supporting sides of the prop stand to rotate when the spindle of the prop stand is rotated.

5. The support apparatus of claim 4, wherein the shell comprises a back cover, the back cover comprises a receiving channel communicating with the sliding rail, and the shape and size of the receiving channel are substantially the same as the supporting sides of the prop stand, and when the prop seat is located at a predetermined position in the sliding rail, the prop stand can be rotated towards the receiving channel to allow the supporting sides to be received in the receiving channel, with a lower one of the supporting sides of the prop stand being received in a lower horizontal portion of the receiving channel, and an inclined one of the supporting sides of the prop stand being received in an inclined portion of the receiving channel.

6. The support apparatus of claim 5, wherein a locking member is disposed on the back cover beside a corner of the receiving channel where the horizontal portion and the inclined portion of the receiving channel meet, and when the supporting sides of the prop stand are received in the receiving channel, the locking member abuts against a corner of the prop stand where the lower and inclined supporting sides meet, and the locking member prevents the supporting sides of the prop stand from falling out of the receiving channel.

7. An electronic device assembly comprising:
an electronic device; and
a support apparatus holding the electronic device and configured for supporting the electronic device on a supporting surface, the support apparatus comprising:
a shell configured to receive the electronic device, the shell defining an elongated sliding rail; and
a back-support comprising:
a prop seat detachably engaged in the sliding rail and slidable in the sliding rail upon application of an external force; and
a prop stand having one side rotatable engaged in the prop seat and serving as a spindle, and at least another side fixed relative to the spindle and capable of being switched between a folded state in which the at least another side is substantially coplanar with the prop seat and a supporting state in which the at least another side is angled relative to the prop seat and serves as at least a supporting side, the switching executable by rotating the at least another side in unison with rotating the spindle in the prop seat;

wherein when the at least another side of the prop stand is angled relative to the prop seat, a tilt angle of the electronic device on the supporting surface is adjustable by sliding the prop seat in the sliding rail, the prop seat comprises a base, a sliding unit and a first fixing unit, the base comprises an elongated receiving groove having the spindle of the prop stand rotatably received therein and at least one limiting member bounding part of the receiving groove to help hold the spindle of the prop stand in the receiving groove, the sliding unit is slidable along the sliding rail, the sliding rail comprises a second fixing unit, and the prop seat is capable of being held at a desired position in the sliding rail by cooperation of the first fixing unit with the second fixing unit, the first fixing unit is located at a top of the base of the prop seat, and comprises two elastically deformable hooks extending away from each other, the sliding rail defines a sliding groove, the sliding groove is bounded by two opposite long sidewalls, a top end of each sidewall comprises a plurality of teeth, and the teeth of both sidewalls cooperatively serve as the second fixing unit of the sliding rail, and when the two hooks of the prop seat are slid along the teeth of the second fixing unit to a desired position, the teeth hold the hooks in the desired position so that the prop seat is held at the desired position in the sliding rail, the sliding unit comprises two slidin lates extendin from two opposite elongated sides of the base, each sidewall of the two opposite long sidewalls of the sliding groove defines a slot, and the sliding plates are slidably engaged in the slots such that the prop seat is slidable in the sliding rail, an end portion of each sliding plate near the top of the base is thinner than a remaining main portion of the sliding plate, and an end portion of each slot at the second fixing unit is narrower than a remaining main portion of the slot, the narrower end portion of each slot corresponds to the thinner end portion of a respective sliding plate, and the remaining main portion of said each slot corresponds to the remaining main portion of the respective sliding plate.

8. The electronic device assembly of claim 7, wherein a top portion of the sliding rail at the second fixing unit comprises a recessed plate, the recessed plate substantially interconnects the two opposite sidewalls of the sliding groove, and the recessed plate supports a top portion of the prop seat.

9. The electronic device assembly of claim 7, wherein the prop stand is a triangular frame, one side of the triangular frame serves as the spindle, the at least another side of the prop stand is the other two sides of the triangular frame, and the other two sides of the triangular frame serve as two supporting sides.

10. The electronic device assembly of claim 9, wherein the base further defines two notches at one long side thereof, one of the notches is near a top of the base, the other notch is near a bottom of the base, the notches communicate with the receiving groove and correspond to two ends of the spindle of the prop stand, and the notches allow the two supporting sides of the prop stand to rotate when the spindle of the prop stand is rotated.

11. The electronic device assembly of claim 10, wherein the shell comprises a back cover, the back cover comprises a receiving channel communicating with the sliding rail, and the shape and size of the receiving channel are substantially the same as the supporting sides of the prop stand, and when the prop seat is located at a predetermined position in the sliding rail, the prop stand can be rotated towards the receiving channel to allow the supporting sides to be received in the receiving channel, with a lower one of the supporting sides of the prop stand being received in a lower horizontal portion of the receiving channel, and an inclined one of the supporting sides of the prop stand being received in an inclined portion of the receiving channel.

12. The electronic device assembly of claim 11, wherein a locking member is disposed on the back cover beside a corner of the receiving channel where the horizontal portion and the inclined portion of the receiving channel meet, and when the supporting sides of the prop stand are received in the receiving channel, the locking member abuts against a corner of the prop stand where the lower and inclined supporting sides meet, and the locking member prevents the supporting sides of the prop stand from falling out of the receiving channel.

* * * * *